US011157572B1

(12) United States Patent
Anima et al.

(10) Patent No.: US 11,157,572 B1
(45) Date of Patent: Oct. 26, 2021

(54) SHARING USER ACTIVITY DATA WITH OTHER USERS

(71) Applicant: Google Inc., Mountain View, CA (US)

(72) Inventors: Mario Ventura Anima, Sunnyvale, CA (US); Irene Chung, Mountain View, CA (US); James Kevin Rodgers, Sunnyvale, CA (US); Brandon Herring, Oakland, CA (US)

(73) Assignee: Google LLC, Mountain View, CA (US)

( * ) Notice: Subject to any disclaimer, the term of this patent is extended or adjusted under 35 U.S.C. 154(b) by 1258 days.

(21) Appl. No.: 14/458,125

(22) Filed: Aug. 12, 2014

(51) Int. Cl.
G06F 3/0481 (2013.01)
G06F 3/0484 (2013.01)
G06F 16/9535 (2019.01)

(52) U.S. Cl.
CPC ........ G06F 16/9535 (2019.01); G06F 3/0481 (2013.01); G06F 3/04842 (2013.01)

(58) Field of Classification Search
None
See application file for complete search history.

(56) References Cited

U.S. PATENT DOCUMENTS

| 8,615,377 B1 | 12/2013 | Yuen et al. |
| 8,738,321 B2 | 5/2014 | Yuen et al. |
| 2007/0078971 A1 | 4/2007 | Zellner et al. |
| 2010/0280920 A1 | 11/2010 | Scott et al. |
| 2011/0119732 A1* | 5/2011 | Dunn ............ H04L 63/102 726/1 |
| 2011/0276925 A1 | 11/2011 | Tumanov et al. |
| 2012/0311447 A1 | 12/2012 | Chisa et al. |
| 2013/0054720 A1 | 2/2013 | Kang et al. |
| 2014/0007010 A1 | 1/2014 | Blom |
| 2014/0099614 A1 | 4/2014 | Hu et al. |
| 2014/0164611 A1 | 6/2014 | Molettiere et al. |

OTHER PUBLICATIONS

Tlrobinson, Geolocation Possibilities on the iPhone, Sep. 2007, http://tlrobinson.net/blog/2007/09/geolocation-possibilities-on-the-iphone/.*
IPhone 1$^{st}$ Generation Teardown Jun. 29, 2007, ifixit, https://www.ifixit.com/Teardown/iPhone+1st+Generation+Teardown/599.*

(Continued)

Primary Examiner — Jason G Liao
(74) Attorney, Agent, or Firm — IP Spring

(57) ABSTRACT

Implementations relate to sharing user activity data with other users. In some implementations, a method includes evaluating one or more actions of a second user to detect that the second user is interested in one or more attributes of one or more activities performed by a first user and described in activity data of the first user. A request is provided to the first user to share at least a portion of the activity data with the second user. The method receives, in response to the request, an indication from the first user to share a designated portion of the activity data with the second user. The method causes the activity data to be made accessible to the second user, and provides information for presentation via a device to the second user, where the presented information is derived from the shared portion of the activity data.

11 Claims, 8 Drawing Sheets

(56) References Cited

OTHER PUBLICATIONS

Gould et al., How to you implement a Highpass filter for the IPhone Accelerometer Sep. 27, 2008, stack overflow, http://stackoverflow.com/questions/142944/how-do-you-implement-a-highpass-filter-for-the-iphone-accelerometer.*

Geolocation possibilities on the iPhone Sep. 10, 2007 [archive.org capture on Feb. 23, 2012, tlrobinson.com, https://web.archive.org/web/20120223134552/http://tlrobinson.net/blog/2007/09/geolocation-possibilities-on-the-iphone/.*

IPhone $1^{st}$ Generation Teardown Sep. 24, 2009, ifixit.com, https://www.ifixit.com/Teardown/iPhone+1st+Generation+Teardown/599.*

Gould, How do you implement a Highpass filter for the IPhone accelerometer? Sep. 27, 2008, stackoverflow.com, http://stackoverflow.com/questions/142944/how-do-you-implement-a-highpass-filter-for-the-iphone-accelerometer.*

Teevan et al., The Perfect Search Engine is Not Enough: A Study of Orienteering Behavior in Directed Search Apr. 24-29, 2004, CHI2004, ACM, p. 415-422.*

Guy et al., Social Media Recommendation based on People and Tags, Jul. 19-23 SIGIR '10, ACM, pp. 194-201.*

Lotus Connections APIs date unknown, IBM, v2.5, https://www.ibm.com/support/knowledgecenter/SSYGQH_2.5.0/com.ibm.connections.25.help/c_api_welcome.html.*

Creating an activity node from a template date unknown, IBM, v2.5, https://www.ibm.com/support/knowledgecenter/SSYGQH_2.5.0/com.ibm.connections.25.help/r_api_act_create_entry_with_template.html.*

Siddle, Lotus Connections 2.5—in depth review Sep. 5, 2009, headshift.com, https://www.headshift.com/our-blog/2009/09/05/lotus-connections-25-in-depth/.*

Authorizing users and portlets date unknown, IBM, v.2.5, https://www.ibm.com/support/knowledgecenter/SSYGQH_2.5.0/com.ibm.connections.25.help/connections_portlets_auth_25.html.*

McIntyre, Lotus Connections 2.0—A Deployment Portfolio Aug. 8, 2009, Collaboration Matters Limited, https://www.slideshare.net/stuartmcintyre/lotus-connections-20-a-deployment-portfolio.*

Zheng, V. et al., "Collaborative Location and Activity Recommendations with GPS History Data," Hong Kong University of Science and Technology, WWW 2010, Association for Computing Machinery, Inc., Apr. 25, 2010.

Brown, B. et al., "Sharing the square: Collaborative Leisure in the City Streets," Proceedings of the Ninth European Conference on Computer-Supported Cooperative Work, 2005, pp. 426-448.

Zheng, Yu, "GeoLife: Building social networks using human location history," Microsoft Research, accessed Jul. 1, 2014.

"Friday: automated journal", Android Apps on Google Play, https://play.google.com/store/apps/details?id=com.dexetra.friday, accessed Jun. 30, 2014.

"Friday FAQ," http://www.fridayed.com/faq.html, accessed Jun. 30, 2014.

"'Friday' for Android app review" GSMArena Blog, http://blog.gsmarena.com/friday-for-android-app-review/, Aug. 18, 2013.

"Moves—Android Apps on Google Play," https://play.google.com/store/apps/details?id=com.protogeo.moves, http://www.moves-app.com/, accessed Jul. 1, 2014.

* cited by examiner

SHARING USER ACTIVITY DATA WITH OTHER USERS

BACKGROUND

The popularity and convenience of digital devices as well as the widespread of use of Internet communications have allowed a variety of information to be sent and received by users. For example, user content such as text, digital photographs, audio recordings, etc. can be posted to various Internet sites, such as web page and social networking services, for users to view or otherwise experience. In some examples, users can send content at any time to network servers for viewing by others from personal and portable devices. Users can browse social networking sites and other sites to see content posted by various friends and other users having social connections to the users.

SUMMARY

Implementations of the present application relate to sharing user activity data with other users. In some implementations, a method includes evaluating one or more actions of a second user to detect that a second user is interested in one or more attributes of one or more activities performed by a first user and described in activity data of the first user. A request is provided to the first user to share at least a portion of the activity data of the first user with the second user. The method receives, in response to the request, an indication from the first user to share a designated portion of the activity data of the first user with the second user. The method causes the activity data of the first user to be made accessible to the second user, and provides information for presentation via a device to the second user, where the information is derived from the shared designated portion of the activity data of the first user.

Various implementations and examples of the method are described. For example, the one or more actions may have been performed for a purpose other than accessing the activities and activity data of the first user and may be only incidentally related to the activities performed by the first user. In some examples, evaluating one or more actions can include detecting one or more searches related to the attributes which were input by the second user to a search engine implemented on a device, and/or one or more selections by the second user of search results related to the one or more attributes, where the search results result from at least one search input by the second user in the search engine. Evaluating one or more actions can include detecting data sent or received by the second user on the device and relating to the one or more attributes, and/or detecting that the second user has visited a location related to the one or more attributes.

The provided information can be automatically presented in response to the second user using the device and performing at least one action related to at least one of the activities performed by the first user, and the information can related to the action of the second user. The action can include the second user inputting a search request related to at least one of the activities of the first user, and/or the second user selecting, sending, or receiving data using the device, where the data includes one or more attributes similar to the one or more attributes of the activities described in the activity data of the first user. The activity data can reference one or more geographic locations previously visited by the first user during the one or more activities, and the at least one action can include the second user becoming physically located within a predetermined distance of at least one of the geographic locations.

The first user can have a social connection to the second user. The activity data can include one or more opinions or ratings by the first user regarding attributes related to the one or more activities, and/or one or more pictures or messages captured by the first user regarding attributes related to the one or more activities. The method can further include providing at least a portion of the first user activity data for display by the device of the second user in accordance with input received from the second user requesting such display. The method can include receiving selections from the second user of one or more items in the first user activity data, and instructing that a notification be output on the device to the second user in response to the second user performing activities related to the one or more selected items.

A method includes, in some implementations, evaluating one or more actions of a second user to detect that a second user is interested in one or more attributes of one or more activities performed by a first user and described in activity data of the first user. The one or more actions were performed for a purpose other than accessing the activities and activity data of the first user, and the first user has a social connection to the second user. The method provides a request to the first user to share at least a portion of the activity data of the first user with the second user. In response to the request, the method receives an indication from the first user to share a designated portion of the activity data of the first user with the second user, and causes the activity data of the first user to be made accessible to the second user. The method provides information to the device for presentation to the second user, where the information is automatically presented in response to the second user using a device and performing at least one action related to at least one of the activities performed by the first user. The information is related to the at least one action of the second user and is derived from the shared designated portion of the activity data of the first user.

In some implementations, a system can include a storage device and at least one processor accessing the storage device and operative to perform operations. The operations include evaluating one or more actions of a second user to detect that a second user is interested in one or more attributes of one or more activities performed by a first user and described in activity data of the first user. The operations include providing a request to the first user to share at least a portion of the activity data of the first user with the second user. In response to the request, the method receives an indication from the first user to share a designated portion of the activity data of the first user with the second user. The operations include causing the activity data of the first user to be made accessible to the second user, and providing information for presentation via a device used by the second user, where the information is derived from the shared designated portion of the activity data of the first user.

The system can include various features. For example, the operation of evaluating one or more actions can include detecting one or more searches related to the one or more attributes and input by the second user to a search engine implemented on a device, and/or detecting one or more selections by the second user of search results related to the one or more attributes, where the search results result from at least one search input by the user in the search engine. The operation of evaluating one or more actions can include detecting data sent or received by the second user on the device and relating to the one or more attributes, and/or detecting that the second user has visited a location related to the one or more attributes.

The provided information can be automatically presented in response to the second user using a device and performing at least one action related to at least one of the activities performed by the first user, where the information is related to the at least one action of the second user. The action can include the second user inputting a search request related to at least one of the activities of the first user, selecting, sending, or receiving data using the device (where the data includes one or more attributes similar to the one or more attributes of the activities described in the activity data of the first user), and/or becoming physically located within a predetermined distance of a geographic location, where the activity data references the geographic location previously visited by the first user during the one or more activities. A further operation can provide at least a portion of the first user activity data for display by the device of the second user in accordance with input received from the second user requesting such display.

DETAILED DESCRIPTION

Figure 1:
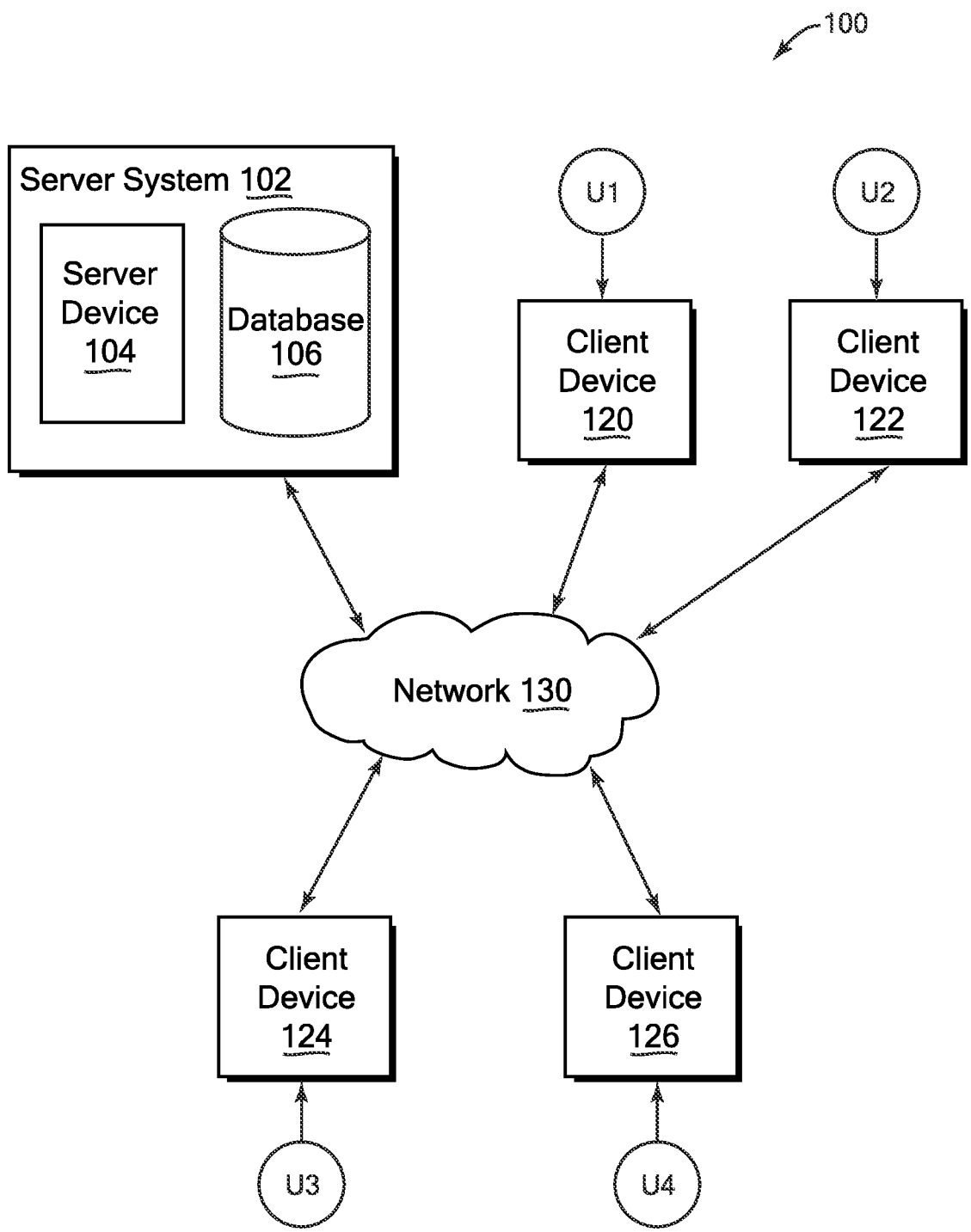
FIG. 1 is a block diagram of an example network environment which may be used for one or more implementations described herein.

One or more implementations described herein relate to sharing user activity data with other users. Activity data describing activities of a first user can be stored, and the system can automatically determine whether a second user is interested in one or more activities that are included in the activity data of the first user based on actions of the second user. If there is such interest, the system can automatically request the first user to allow access to relevant activity data by the second user. If the first user grants permission, the system can use this shared activity data to enhance output on devices used by the second user. For example, information derived from the first user's activity data can be provided to the second user's device and can be automatically displayed to the second user on a device if the second user performs actions related to the activities of the first user included in the accessible activity data. Furthermore, users can command the display of activity data in convenient and easy-to-understand formats and interfaces allowing the user to quickly evaluate activity data and/or perform other functions such as sharing and editing of the activity data.

These and other described features can allow automatic, convenient, and relevant sharing and viewing of activity data between users such as socially-connected users. For example, described features allow a user to obtain helpful information from friends and other users who have previously performed activities that are the same or similar to the activities that the second user is now doing, e.g., who went to the same places and/or performed the same activities. This can provide convenient, relevant, and valued opinions, reviews, comments, and guiding information to the user that originated from people that the user knows and trusts. Described features also can provide automatic detection of interest of a user in activities of another user. For example, in some implementations the system can evaluate a user's actions that can include actions performed for a purpose of the second user's other than accessing activities and activity data of other users, such as searching for subjects or topics using a search engine, selecting, viewing or sending content data, or visiting locations. The system can determine whether the actions are related to attributes of recorded activities of other users. In this way, the system can in some implementations automatically check for and infer user interest of other users' activities in the background while the user performs actions for purposes that are only incidentally related to activity data, thus determining which other users' activity data may be relevant to the user's interests as an additional (and in some cases, user-unintended) benefit to the user's actions. The system also can automatically cause the prompting of the appropriate other users for permission to share their relevant activity data to the user. Described features also include detecting actions of a user and providing output information for the user based on the shared activity data, where the output information is relevant to the user's actions. The output of such information can also be incidental to the user's purpose in performing the actions. For example, the actions can be primarily intended for other purposes such as viewing search results on topics or subjects, selecting, viewing or sending content data, or visiting locations, such that the user receives an additional benefit of the output based on other user activity data.

Such features alleviate users from having to manually ask for and remember to provide relevant activity data between socially-connected users. Furthermore, users do not need to search for such relevant activity data manually. Thus, technical effects of sharing activity data as disclosed herein include a reduction in user time searching for and/or providing activity data of other users, thus saving a user time, energy, and resources. Another technical effect is a higher quality of provided information that is relevant to user interests in activities and is presented close in time to when the user has expressed such interest while using a device.

An "activity attribute" or "attribute of activity" as referred to herein can be any characteristics, subjects, or topics which can be included in activity data to describe an activity. For example, activity attributes can include location names, addresses, or coordinates (e.g., describing activities performed at the location), specific work or hobby names (describing these activities, e.g., estate planning, comic book collecting, bowling, etc.), more general activity names (e.g., traveling, going on vacation, riding a car, viewing content), specific names of works of content being used in activities such as sending, receiving, playing, or referring to content (e.g., titles of movies, books, games, articles, essays, songs, monument or tour pictures, etc.), particular names of characters, events, objects, concepts, or other characteristics described in a sent/received/referred work of content, etc. The term "content" or "work of content" can refer to information to be read, viewed or otherwise experienced by users and including one or more types of information, such as text (books, magazines, papers, letters, text comments, text ratings, etc.), images (photos, drawings, etc.), video (movies, shorts, clips, etc.), audio (e.g., music, voice recordings, sound excerpts from a video source, etc.), games (e.g., a video game, a recording of game play, or other game-related information), or geographic location (e.g., map data, GPS data, images of scenery, etc.), or a mixture of two or more of these types. A work of content can be a unit or piece of content. An "image" as referred to herein can be a still image, single image, or standalone image, or can be an image extracted from a sequence of images, e.g., a frame in a video sequence of video frames.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, laptop computer, portable device, cell phone, smart phone, tablet computer, television, TV set top box or entertainment device, wearable devices (e.g., display glasses or goggles, wristwatch, etc.), personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1-U4 may interact with each other via a social network service implemented on server system 102, where respective client devices 120, 122, 124, and 126 transmit communications and data to one or more server systems such as system 102, and the server system 102 provides appropriate data to the client devices such that each client device can receive content uploaded to the social network service via the server system 102. In some examples, the social network service can include any system allowing users to perform a variety of communications, form links and associations, participate in live video, audio, and/or text chat with other users of the service, upload and post shared content including text, images, video sequences, audio sequences or recordings, or other types of content for access by designated sets of users of the social network service, and/or perform other socially-related functions.

For example, the social network service can allow a user to send messages to particular or multiple other users, form social links in the form of associations to other users within the social network system, group other users in user groups, etc. A user can designate one or more user groups to allow users in the designated user groups to access or receive the user's posted content, profile information, and other information associated with the user on the social networking service. In some implementations, the access of users to user information can be designated in terms of larger groups, such as a "public" setting designating all the users of the social network service, "acquaintances" to indicate friends of friends, or a different privacy level setting. Some implementations of a social networking service allow the user to designate groups of users including extended or additional socially-linked levels (degrees of separation) of users (e.g., friends of the friends). A user may also be able to designate other groups or sets of users for access regardless of whether those other users are in the user's own groups. For example, the user may designate users belonging to a group or list, or having one or more specified characteristics, such as age, membership in a designated organization, eye color, designated hobbies or interests, member of a designated organization since a particular time or date, etc.

For example, the first user and second user described herein can be users of a social network service or other network service. Other network services or applications can also be implemented using the network environment 10 and used by users to communicate messages, content, and information with each other, e.g., photo collection services, web page forums, etc.

A user interface can enable display of images and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen.

Other implementations of features described herein can use any type of system and service. For example, any type of electronic device can make use of features described herein. Some implementations can process one or more features on client or server systems disconnected from or intermittently connected to other devices or computer networks, and features can then be provided to connected devices. In some examples, a client device having a display screen can display images and provide features and results as described herein that are viewable to a user.

Figure 2:
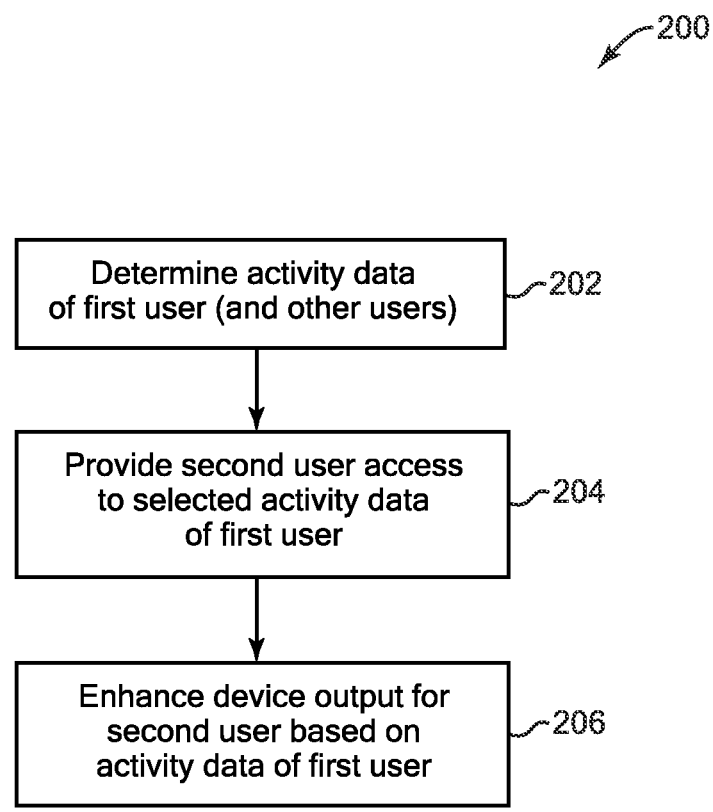
FIG. 2 is a flow diagram illustrating an example method for sharing user activity data with other users, according to some implementations.

FIG. 2 is a flow diagram illustrating one example of a method 200 for sharing user activity data with other users. In some implementations, method 200 can be implemented, for example, on a server system 102 as shown in FIG. 1. In other implementations, some or all of the method 200 can be implemented on a system such as one or more client devices, and/or on both a server system and a client system. In described examples, the implementing system includes one or more processors or processing circuitry, and one or more storage devices such as a database 106 or other storage. In some implementations, different components of one or more servers and/or clients can perform different blocks or other parts of the method 200.

Method 200 can be implemented by computer program instructions or code, which can be executed on a computer, e.g., implemented by one or more processors, such as microprocessors, microcontrollers, or other processing circuitry and can be stored on a computer program product including a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, method 200 can be implemented in hardware (logic gates, etc.), or in a combination of hardware and software.

In some implementations, method 200, or portions of the method, can be initiated based on user input. A user may, for example, have selected the initiation of the method 200 from an interface such as an application interface, a social networking interface, or other interface. In other implementations, the method 200 can be initiated automatically by a system. For example, the method 200 (or portions thereof) can be continuously or periodically performed, or performed based on one or more particular events or conditions such as a user opening an application such as a communication application or editing application, detecting particular user activity (e.g., as described below), etc. In some implementations, such conditions can be specified by a user in custom preferences of the user. In some implementations, the method 200 or portions thereof can be performed with guidance by the user. For example, a user can designate a portion of activity data to be processed by blocks in method 200. In one example, method 200 (or portions thereof) can be performed on a cell phone, tablet computer, wearable device, or other client device that can send or receive data. In addition or alternatively, a client device can send data to a server over a network, and the server can process the data using method 200, or the server can receive data from a different source (a different server, etc.).

In block 202, the method determines activity data of one or more users including a first user, and/or a second user and other users. The activity data can be any type of data describing activities, conditions, or events that the user performed or occurred with respect to the user. Other related data can also be included in activity data. For example, activity data can describe places and locations to which the user moved or traveled, types of transportation used by the user, activities performed by the user (sports, games, watching or listening to content data, going to meetings, working, staying at home, etc.), and content data that was input, posted, and submitted by the user using electronic devices. Some examples of processing activity data are described below with respect to FIG. 3. In some example implementations, a first user's activity data is determined in block 202. In some implementations, a second user's activity data can also be determined, and/or the activity data of multiple other users. For example, each user can have a set of stored activity data which that associated user can access.

In block 204, the method provides the second user access to selected activity data of the first user. In various implementations, the selected activity data can include activity data that has been selected by the first user for access by the second user, and/or can include activity data that has been selected by the system to be relevant to the second user. For example, the system can automatically detect interest of the second user in particular attributes of activities and can provide the second user access to related activity data of the first user. For example, the method detects second user interest by evaluating second user actions, and in some implementations these actions can have a purpose other than accessing activity data, such as performing a search, selecting, viewing, or receiving content data, or visiting a location. Some examples of detecting second user interest, selecting first user activity data, and sharing the data for access by a second user are described below with respect to FIG. 4.

In block 206, the method causes an enhancement (e.g., augments) the second user's device output with at least a portion of the selected activity data of the first user. For example, this enhancement of output can be automatically performed at any time after the second user has obtained access to the selected activity data of the first user. In some examples, enhanced device output can include enhanced search results, notifications, reminders, content viewing and other output, etc. For example, the enhanced output can be output based on actions of the second user, and in some implementations these actions can have a purpose other than accessing activity data, such as performing a search, selecting, viewing, or receiving content data, or visiting a location. In some implementations, the first user and/or second user can prohibit or otherwise limit the access or use of the first user's activity data in the determination of the device output, e.g., turn on or off the enhancement. Some examples of device output enhancement are described in greater detail below with respect to FIG. 5.

The features described herein allow activity data describing activities of a user to be processed and provided or accessed by other users for enhancement of output of the devices of those other users. Such features allow one user to conveniently provide access to his or her activity data by one or more other desired users (or other entities), such as friends, family, organizations, or others (all collectively termed "users" herein). Furthermore, features can include automatically detecting interest of a second user in activity data of a first user and providing access to relevant portions of the first user's activity data, allowing the second user convenient and relevant access to information with reduced effort in acquiring the information.

Figure 3:
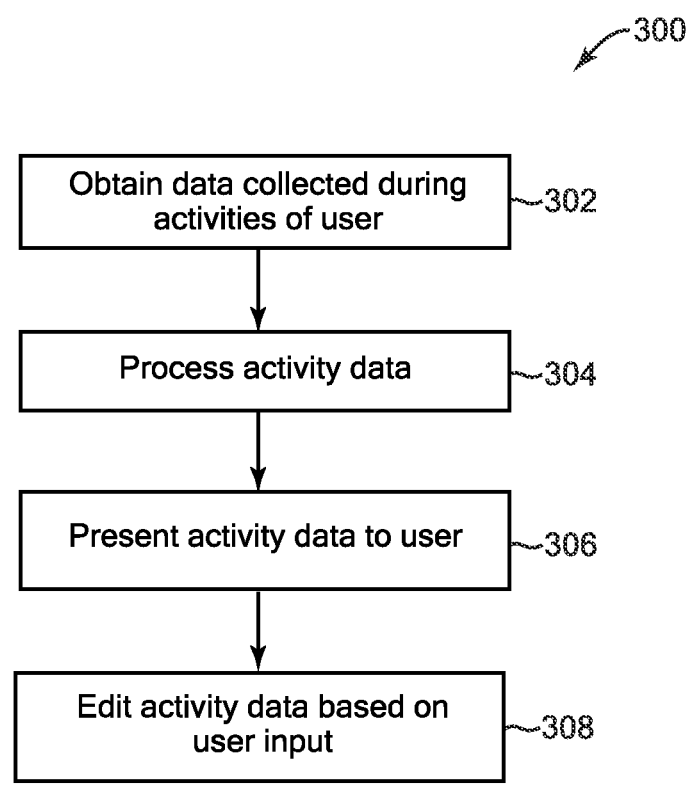
FIG. 3 is a flow diagram illustrating an example method implementing a block of FIG. 2 in which the method determines activity data for one or more users.

FIG. 3 is a flow diagram illustrating an example method 300 implementing block 202 of FIG. 2, in which the method determines activity data for a user, according to some implementations. Method 300 can be implemented by a system that is or includes, for example, a server and/or client device as described above for method 200. Method 300 can be implemented by the same or different system than a system performing blocks after block 202 in method 200. For example, method 300 can be implemented regularly or periodically on a user's device or devices, independently of the user's communications, so that new activity data is regularly determined for new activities performed or occurring to the user. Activity data can be collected for any user, such as the first user described with reference to FIG. 2.

In some implementations, user activity can be detected and monitored (as described below) on any of multiple devices used by the user, and/or method 300 (or portions thereof) can be performed by a system that is not the same as the device with which the user is performing an activity. For example, a server or client device (such as a desktop or laptop computer) may be operating on standby and can detect via wired or wireless signals if the user operates other client devices, such as a cell phone or tablet computer. Such a server or client device can perform method 300 based on user activity sensed by the remote client device that the user is using (e.g., operating or carrying). For simplicity, in the example implementations described for FIG. 3, the method 300 is described as being run on the same device with which the user is performing an activity.

The obtained activity data described below can be stored on local and/or remote, network-connected storage device(s) that are accessible to the method 300. In some implementations, activity data can be stored on storage devices that are also accessible to methods 200, 400, and 500 described herein.

In block 302, the method obtains data that has been collected during activities (including environmental conditions) experienced by the user, and/or data describing such activities. This data is collectively referred to as "activity data" herein. In some examples, the activity data can include data that is automatically sensed by a device based on the user's active or passive operation of the device. For example, the activity data can include content actively input and/or selected by the user, such as written text, audio data, image data, video data, or other types of content data that is recorded or otherwise input, selected, or captured by the user using the device. In some examples, the user can input text using a keyboard, keypad, or microphone for voice recognition. A user can input audio data using a microphone, or input video or image data by using a camera that is included as part of the device or a camera that is communicatively coupled to the device. The input or selected data can include notes, comments, articles, calendar event descriptions, list, blog, and journal entries, ratings, etc. Input or selected image data can include uploaded images to a network service, such as a social networking service, photo collection service, etc.

Activity data can also include data sensed or received during passive use of the device by the user. Such passive use can include carrying a portable device that can receive data from sensors and/or other devices communicatively coupled to the device. The passive use can include designating a device to monitor conditions, execute actions based on conditions, and/or send/receive data to/from other devices. In some examples, the activity data can include location data (e.g., latitude and longitude, or other geographical location data such as names of locations) sensed by a device or received by a device from other sensors, that indicate a geographic or physical location of a user at particular times. The activity data can also include weather data describing a current weather condition at the user's location at a particular time, or particular types of received data from other sources (e.g., content data, stock market information, news, etc.). In some cases such activity data can include the times and durations that the user viewed output the received data on the device.

Some additional examples of activity data can include time and description of telephone calls, emails, messages, video conference calls, and other communication data sent to and received from specific people or users. Additional examples include search requests and search results selected by the user, time and selections made during web page browsing or other activity performed in a web browser or other network application, identifications of persons met in physical meetings (e.g., detections of other persons' devices in proximity to the user), descriptions and times of events and activities in calendars, to-do lists, schedules, or other user lists (meetings, birthdays, vacations, etc.), alarm clock settings, sensed mode and duration of transport (bicycle, car, train, walking, etc.), online shopping activities performed through devices (purchases, deliveries, offers, bids, etc.), registrations for network services and web pages, physical or biometric data of the user sensed by personal devices, sports and other physical activity data sensed via sensors carried by the user or monitoring user activity, etc. Some implementations can organize activity data into types, categories, and/or sections. In one example, activity data can be divided into sections, where some sections of data relate to vacations or trips taken by the user, and other sections relate to normal, at-home activities.

Such activity data can be obtained by method 300 in various ways. For example, the method 300 can obtain activity data directly via sensors on a device, checking user input on a device, etc. In some implementations, the method 300 can obtain some or all of the activity data from other sources, e.g., other sensors or devices connected over a network that have sensed or obtained the activity data, and/or online or local databases and services storing reference information such as place names, event names and times, weather data, etc. as well as specific information for the user in user accounts. The activity data can be stored on one or more storage devices of the system or otherwise accessible to the system implementing method 300, such as a connected storage device, e.g., a local storage device or storage device connected over a network.

In block 304, the method can process the activity data to generate additional information about the user and his or her activities. For example, the processing can include aggregating the activity data into summaries in different categories, such as aggregating the time the user spent traveling by car, traveling by bicycle, working at a workplace, going out to lunch, spent at home, etc. In another example, the method can aggregate the number of times the user performed a particular activity, received a particular type of data, etc. These summaries can also be determined based on user input selecting particular parameters, such as activities related to a particular attribute (subject, topic, characteristic, etc.) input by the user, or showing summaries of activities occurring in a particular time span or time period designated by the user. In some implementations, the method can also look for patterns in the activity data to determine which activities the user performs routinely (e.g., occurs more than a threshold number of times within a particular time period), and which activities were performed by the user more rarely (e.g., occurs less than the threshold number of times).

In block 306, the method can cause the activity data to be presented to the user, if desired by the user. For example, the user can view presented activity data on a display, such as a display screen, of a client device or server device. In some examples, the method can display a list or other display form of activities of the user according to parameters input by the user, such as time period, attribute, etc. For example, if the user inputs the most recent day as a time period, the method displays the most recent day's recorded activity data. The user can request a display of activity data according to one or more user-specified parameters such a particular time period (day, a week, month, etc.), attribute, and/or other category. Some implementations can display the processed information of block 304. For example, aggregated totals of particular activities in different categories can be displayed, such as the total amount of time that the user spent in different particular activities (walking, riding a bicycle, working at an office, sleeping at home). More rare activities that the method found among the user's activity data in block 304 can be displayed more prominently in some implementations, to point out deviations from the user's routine. In some examples, a server can store activity data and provide the activity data that is to be displayed by a client device to the user, and in other examples the client can store activity data locally to the client and display this data as needed.

In another example, the method can cause a graphical timeline of the desired activity data to be displayed for the user. For example, the timeline can show graphical icons, labels, and/or other items representing different activities of the user at particular times on the timeline. The items can be selected by the user to show additional detail about the selected activity. For example, in some implementations, a more-detailed timeline can be displayed for the selected activity, showing a time scale of greater resolution and activities broken down into multiple more detailed items.

In block 308, the method edits activity data based on user input. For example, the user can edit existing activity data, delete activity data, or add to existing activity data using an interface. Block 308 can be performed at any time by the user, e.g., after activity data has been obtained, during acquisition of additional activity data, etc.

In some implementations, the user can select items presented by block 306 that represent activities, and edit the selected activities. In some examples, the user can add notes or descriptions to particular activities which may not have been automatically determined, such as a description of a movie that was seen, a summary of conversation topics between a group of people, a description of food eaten at a meal, feelings, ratings, or comments about one or more activities, reminders, etc. The user can also add pictures, audio files, text, or other types of content to any activity represented in the activity data.

The activity data, or portions thereof, may also be edited by the user to be directly shared with one or more other particular users, or one or more groups that each include one or more users, such as user groups defined by the user in a social networking service. Such directly-shared data can be accessed by designated other users similarly as shared activity data is accessed by the second user described below. The user can decide to share certain portions of his or her activity data based on time period, subject, type, or other criteria. For example, the user may decide to share activity data that describes activities performed over a time period such as a month. The user can share activity data pertaining to a certain type of activity attribute, such as a type of location visited (e.g., restaurants, stores, parks, movie theaters, etc.), a certain type of content or hobby (e.g., science fiction movies, gardening, a certain sport), etc., where all the stored activity data of the user relating to that type are shared. For example, the user can easily select and share visited locations relating to an attribute, comments or ratings of content relating to an attribute, photos depicting content relating to the attribute, etc.

Figure 4:
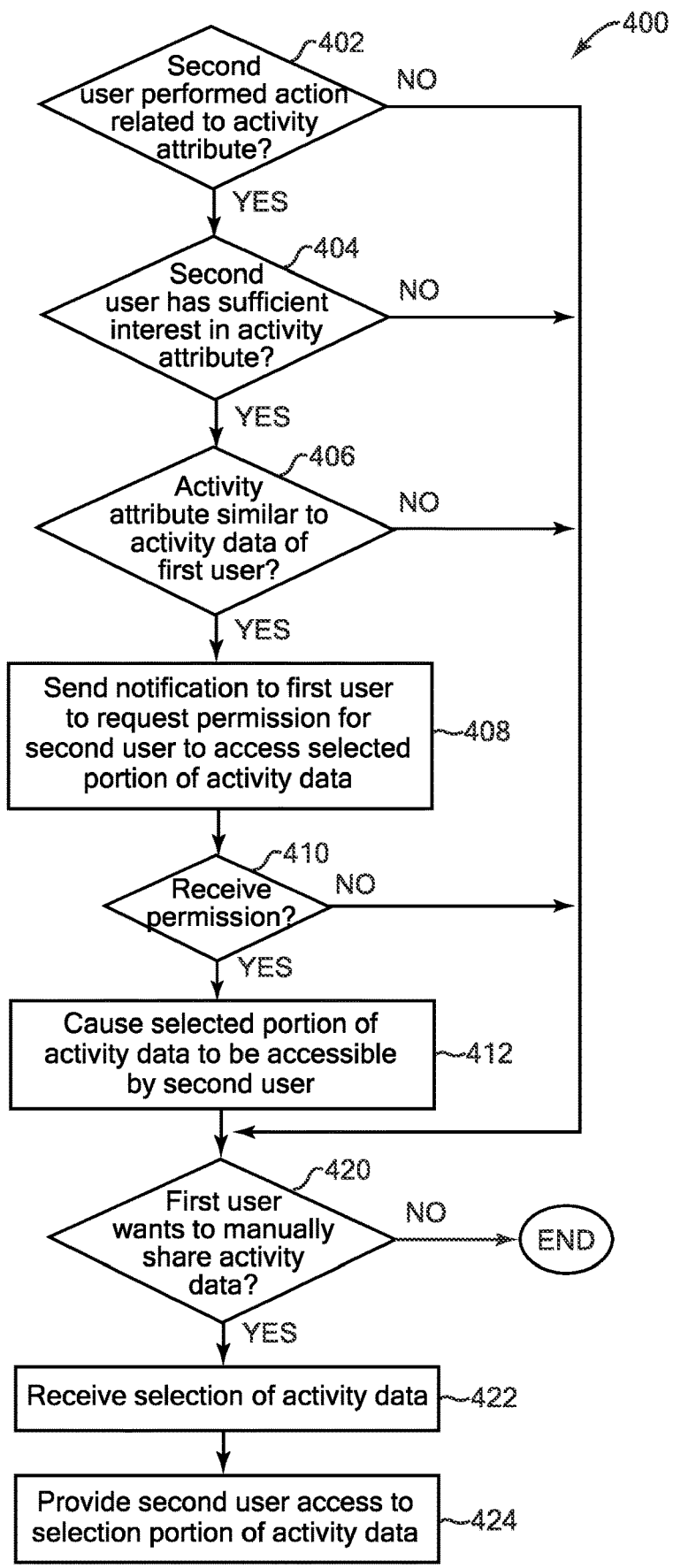
FIG. 4 is a flow diagram illustrating an example method implementing a block of FIG. 2 in which the method provides the second user access to selected activity data of the first user.

FIG. 4 is a flow diagram illustrating an example method 400 implementing block 204 of FIG. 2, in which the method provides the second user access to selected activity data of the first user, according to some implementations. Method 400 can be implemented by a system that is or includes, for example, a server and/or client device as described above for method 200. In this example, the method automatically determines or infers whether a second user is interested in one or more attributes of activities that are included in activity data of a first user (or other users), based on one or more actions of the second user. In some implementations, the actions of the second user can have a purpose other than accessing activity data, e.g., actions that are directed by the second user to an objective other than accessing activity data. Based on that user interest, the method requests the first user to allow access to relevant activity data by the second user, and provides that access if permission is granted. In addition, the method checks if the first user has manually shared activity data with the second user, e.g., as initiated by the first user.

In block 402, the method checks (e.g., evaluates) whether the second user has performed one or more actions related to one or more attributes of activities (also referred to as "activity attributes"). The actions can be in any of a variety of forms, and the actions need not be directed by the second user to accessing activities or activity data of other users. For example, the actions can be performed by the second user for a purpose and to an objective other than accessing activities or activity data, where the method checks whether the actions are incidentally related to attributes of activities. In this way, the method can automatically check for user interest of activity attributes in the background while the second user performs actions for other purposes.

In some examples, the action can be in the form of a search request or search query input into a search engine or other search application, where the method 400 can monitor such search requests. In some implementations, the second user can enter the search request in textual form, e.g., using one or more keywords. For example, the user can input text using an input device of a client device, such as a keyboard, touchscreen, mouse, etc. In other cases, the search request may be in a different form, such as graphical (e.g., image that the user selects for search), audio (e.g., audio file or item that the user selects for search), etc. In some examples, the search request can include a search query having one or more topics or subjects and has a purpose to obtain search results from one or more data sources including Internet web pages, databases, local databases or storage devices, etc. In some implementations, the search can be intended by the user to obtain search results from such data sources that do not store (or have accessible) activity data of particular users, e.g., the second user is not intending to receive results based on activity data of other users.

The method checks whether the search is related to one or more activity attributes. Activity attributes can be any characteristics, subjects, or topics which can be included in activity data to describe an activity. For example, activity attributes can include location names, addresses, or coordinates (describing activities performed at the location), specific work or hobby names (describing these activities, e.g., estate planning, comic book collecting, bowling, etc.), more general activity names (e.g., traveling, going on vacation, riding a car, viewing content), specific names of works of content being used in activities such as sending, receiving, playing, or referring to sent content (e.g., titles of movies, books, games, articles, essays, songs, monument or tour pictures, etc.), particular names of characters, events, objects, concepts, or other characteristics described in a sent/received/referred work of content, etc.

To determine whether the second user's search action is related to a particular activity attribute, the method can parse the search request for attribute words. For example, names of places, countries, cities, monuments, historical entities, occupations, hobbies, etc., can relate a search request to a particular type of activity, such as visiting a named location, viewing a named work of content, etc. Words in the search request such as nouns, topics, or subjects can be attributes relating to an activity. For example, words describing eating and food topics can relate to going to restaurants, going to parties, or similar activities. Historical words can relate to going to a museum, viewing a documentary film or movie, etc. Sports scores, team names, stadium names, etc. can be related to sports activities such as spectator sports or participating in sports. Words including hotel reservations or car rentals can be related to travel activities. Products and prices can be related to purchasing or selling activities.

Non-textual search requests can be evaluated as well. For example, a search request using an image can be evaluated by performing recognition techniques on the image to find possible activity attributes such as recognizable objects, such as faces, people, animals, landscapes, monuments, or other recognizable objects. Such recognized objects can be checked for relation to activities. For example, a soccer ball can be related to sport activities, or a monument can be related to travel activities.

The evaluated actions of the second user can also include selection of search results by the second user. In some cases, the user's selection of links can help to further define the user's interest. For example, if in response to the second user's search request the system provides search result links to several different types of search results (e.g., web pages found over the Internet having different types of information), and the second user selects one type of search result, this selected result can be considered by the method as to whether it is related to an activity. For example, the second user may input a search query of "paris" and receive several different results, including links to an article about the history of the city Paris, a link to travel sites to see in Paris, and a link to a site describing a celebrity named Paris. If the second user selects the city link or travel link, then this can be evaluated by block 402 as an action related to a travel activity.

Selection of other data can also be used as an user action that is evaluated. For example, the user can select to receive or display content on a device, such as a book, article, movie, song, comments, ratings, or other content. Such content can include activity attributes such as the names of described locations, persons, actors, characters, objects, locations, themes, organizations or entities, occupations and businesses, feelings, or other subjects. Such attributes can be related to activities such as viewing, sending, or receiving content, or visiting a theme park or other location including such attributes, for example. Purchases or sales of goods or services (or related actions, such as bidding) by the user can also be user actions that can be evaluated. For example, certain products purchased such as sporting equipment can be attributes related to sports activity, while purchase of luggage, tour books, travel accessories, etc., can be attributes related to travel activities. In cases such as purchase of tour books and similar items that indicate a particular place or location, an activity related to the place can be inferred. Similarly as with the search query, these selections can be for the purpose of selecting or receiving data that is not activity data of other users.

In other examples, the action of the second user can be sending or input of comments, ratings, or other content provided by the second user. For example, this content can be displayed, stored, or viewed by the second user or one or more other users, such as other users of a networked service (e.g., social networking service, web site forums or community, photo collection service, etc.). In some examples, the second user can write notes on a portable device in a list or journal to read later. In another example, the second user can write comments on a friend user's content, such as a positive comment about the subject of a friend's photo, such as a pet or a place pictured in the photo. Similarly, a user can rate a friend's photo, text posting, comment, or other related information with a positive or negative comment. Such input can be evaluated by the method to determine whether it has attributes related to an activity. For example, input words in a comment or note can be evaluated similarly to the search request described above. Positive comments or ratings for content can be considered to indicate interest in the content that is being commented upon. In some other examples, the user can submit an image as posted content, as a comment, or in response to other users' content. The image can be evaluated similarly as described above to find recognizable objects that can be related to particular activities. Similarly as the actions described above, this sending of content data by the second user can be for a purpose other than accessing activity data of other users, e.g., the second user wishes to comment on or rate friends' postings, content, etc.

In other examples, the action of the second user can be traveling to or visiting locations detected by a device, where a location can be related to travel activities or other activities performed at the location. For example, sensors on a portable device carried by the user, such as GPS sensors or other sensors, can record the latitude and longitude and/or other location data indicating locations visited by the user. Sensed new locations can be evaluated for attributes relating to an activity. For example, going to restaurants is related to eating activity, going to a gymnasium or sporting goods store can be related to sports activities, and going to a friend's house can be related to social activities (party, game, etc.). Such visiting actions can be for purposes other than accessing activity data of other users, e.g., the second user wishes to see a new place, eat at a restaurant, see a movie, etc.

If the method has not detected any actions of the second user related to attributes of activities, then the method continues to block 420, described below. If the method has detected one or more such actions, then the method continues to block 404. In block 404, the method checks (e.g., evaluates) whether the second user has sufficient interest in the one or more related activity attributes (e.g., whether the method can infer such sufficient interest) such that the second user can be considered likely to want to see other users' activity data having one or more similar activity attributes using features described herein. The method can check for sufficient interest from the second user in a variety of ways. For example, the method can check whether the second user has indicated interest in the related activity or activity attribute by a threshold amount, e.g., for a threshold number of times or more. In some examples, if the threshold number is three, then the method checks for user interest in the activity attribute in separate searches, comments, postings, or other input for at least three times over a predetermined time period, such as the last two weeks. If the threshold number is met, then the user is considered sufficiently interested in the activity attribute. In some implementations, active interest can be measured in other ways, such as by checking duration that a user engages in search activity related to the activity attribute, the amount or degree of positive ratings and comments for the activity attribute, etc. Such parameters as threshold(s), time periods, and durations can be varied or user-specified as desired, and/or can be specified individually for different types of activities or activity attributes.

In some implementations, the method can directly prompt the second user to determine the second user's interest. For example, the method can display a question such as, "Do you have more interest in this activity or topic?" In some implementations, the method can perform this direct prompt in response to not receiving clear signals from the second user as to interest in one or more related activities or activity attributes.

If the method has not detected sufficient interest for the one or more related activity attributes from the second user, then the method continues to block 420, described below. If the method has detected sufficient interest, then the method continues to block 406. In block 406, the method checks (e.g., evaluates) whether the activity or any of the activity attributes of interest are similar to one or more attributes includes in the stored activity data of the first user. In some implementations, the method searches stored activity data of one or more users that have a social connection to the second user. For example, the first user can be socially connected to the second user, e.g., by a social graph defined in a social networking service or other network service, by listing the first user in a contact list of the second user (and/or vice versa), or by some other defined relationship that connects the first user to the second user and is accessible to the method. All of the first user's activity data can be accessible to the method, e.g., via a social network service, other service, or server.

In some implementations, the method can check for the similarity in activity data of each of multiple users. For example, the multiple users can be in a social graph, contacts list, or other user group defined by the second user, e.g., indicating a social relationship or other defined relationship with the second user. Each user's activity data can be examined similarly to the first user's activity data in the blocks of method 400.

Checking for similarity can include comparing the activity attributes of interest of the second user with stored data in the activity data of the first user. For example, the method can check for similar words in the descriptions of activities in the activity data. In some implementations, particular attributes such as subject or topic words can be compared for similarity, such as the particular names of travel destinations or points of interest (cities, monuments, museums, restaurants, stores, etc.), or the particular names of content or categories of content, such as titles of books, plays, movies, etc. or category names such as comic books, horror movies, romances, etc., or the particular names of products, services, occupations, hobbies, etc. The method can also check for words, terms, or names that are semantically similar and/or syntactically similar to these words or are otherwise associated with the words (e.g., a similar product by the same company, a close-by point of interest to a named monument, another item on a menu of the same restaurant, a sequel movie to a named movie, etc.). Similarly, non-textual attributes can be searched for similarity, such as similarity in image content, audio file output, etc. In some implementations, for location attributes, the method can find matches to locations in the first user's activity data that are located within a predetermined distance of the location of interest to the second user.

In some examples, if the second user expressed a detected sufficient interest in the city Paris or traveling to Paris, the method can check the first user's activity data for attributes of the text "Paris", as well as for attributes related to Paris, such as monument names (e.g., Eiffel Tower), restaurants located in Paris, plane flights to cities near Paris, photos taken at Paris, and other activity data related to travel to France. In another example, if the second user expressed a detected active interest in eating sushi, then the method can check the first user's activity data for references to visiting, reviewing, and eating at known sushi restaurants, posting sushi recipes, posting photos related to sushi, or other activities related to sushi.

If the method does not find similar activities or attributes in the activity data of the first user, then the method continues to block 420, described below. If the method has found similar activities or attributes in the activity data of the first user, then in block 408, the method automatically sends a notification to the first user to request permission for the second user to access a selected portion of the first user's activity data. In some examples, the selected portion can be selected by the method as the portion of the first user's activity data that is relevant, e.g., includes the activities and attributes that were found to be similar to the activities or attributes of interest to the second user. Similarly, any other user with similar activity data can be prompted for permission for the second user to access that user's relevant activity data.

The notification can be implemented in any of several ways. For example, one or more devices of the first user can receive data provided by a device of the second user, e.g., over one or more communication networks, that cause the first user's device(s) to display the notification that includes the request for permission. The first user device(s) can provide a notification via sound output, tactile output, etc. The notification can also display the selected portions of the first user's activity data that is being requested for permission to be shared with the second user. In some implementations, the first user can designate any portion of the selected portions of activity data to be denied access by the second user, e.g., refusing permission with respect to a particular designated portion of the selected portion. One example of a notification or prompt is shown below with respect to FIG. 7.

In some implementations, the method can directly prompt the second user to check whether the second user would like to notify and/or ask permission of the first user. For example, the method can display a question such as, "Do you want to ask permission to access friends' activity data related to this activity or topic?" or, "Click Yes to search for other friends or contacts having activity data related to this topic." Such prompts can be omitted if the second user has set preferences or settings data that the method can access to indicate the second user's preferences for such actions.

In block 410, the method checks whether permission has been received from the first user to allow the second user access to the selected portion of activity data (e.g., where the selected portion at this stage can be a full, original selected portion selected by the method, or a sub-portion of the selected portion designated by the first user). In some examples, the method can wait for permission from the first user for a predetermined period of time. If no permission is received, then the method continues to block 420, described below. If permission is received, then the method continues to block 412, in which the method causes the selected portion of the first user's activity data to be made accessible to the second user. For example, the method shares the selected portion of activity data so as to provide the second user access to the selected portion of activity data. For example, the method can send the selected portion of activity data to a storage device that is accessible to accounts and/or one or more devices of the second user. Alternatively or additionally, the method can set permission flags or other controls in association with the first user's activity data to allow the second user's accounts and/or devices to access the selected portion of activity data.

In some implementations, the second user can be notified that the first user has granted the second user access to designated activity data of the first user. For example, the method can cause the granted activity data of the first user to be displayed on device(s) of the second user, or can cause display of a summary of the accessible activity data, e.g., the time periods the data covers or other attributes of the data (e.g., subjects or topics, names of locations in the data, etc.).

In block 420, the method checks whether the first user would like to manually share any of his or her activity data. This block can be performed at any time of the method 400 or 300, and can be independent of any request for permission to share as provided in block 408. For example, the first user can command that a portion of his or her activity data be displayed. If the method does not detect that the first user wishes to share activity data, then the method ends (or can return to block 402 to continue checks). Otherwise, the method continues to block 422, in which the method receives input from the first user selecting portions of the displayed activity data to be shared to one or more other designated persons, e.g., to other users of a networked service such as a social networking service, etc. In some examples, the selections can be provided by the first user with reference to blocks 306 and 308 of FIG. 3. For example, the first user can specify criteria such as a particular time period and one or more subjects to select all of his or her activity data that meets the criteria. In other examples, the first user need not share activity data that is displayed, and can select the shared activity data in other ways. For example, the first user can input a voice command to select all of his or her activity data related to a particular spoken time period and/or subject (e.g., restaurants visited in the last year). Such commanded sharing allows the first user to share particular activity data if he or she believes the second user would be interested, or learns from other sources that the second user would be interested.

The method then continues to block 424 to provide access to the selected portion by the second user and any other users specified by the first user. For example, the sharing of the activity data can be performed similarly as described above with respect to block 412. In some examples, the method can return to block 402 to continue checks.

Figure 5:
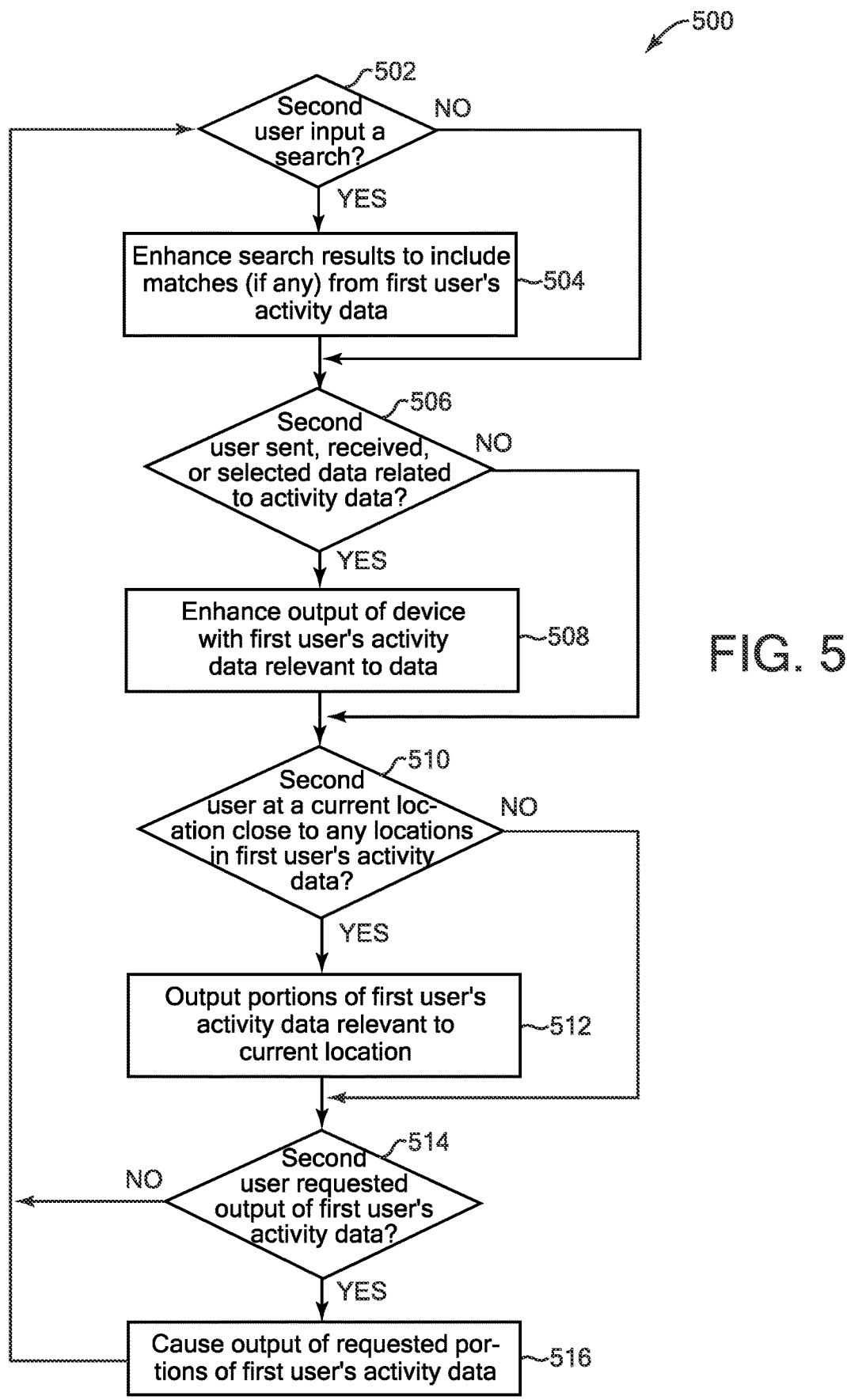
FIG. 5 is a flow diagram illustrating an example method implementing a block of FIG. 2 in which the method enhances device output for the second user based on accessible activity data of the first user.

FIG. 5 is a flow diagram illustrating an example method 500 implementing block 206 of FIG. 2, in which the method enhances device output for the second user based on accessible activity data of the first user, according to some implementations. Method 500 can be implemented by a system that is or includes, for example, a server and/or client device as described above for method 200.

In some examples, method 500 can enhance (e.g., augment) device output with activity data (or with data derived from activity data) in connection with one or more actions performed by the second user as determined by a device, where the actions are related to one or more activities or activity attributes of the first user as described in the activity data. Some examples of user actions and their detection, and enhancement of device output by the method are described below. In some implementations, the actions of the second user evaluated for determining enhanced output can be similar to the actions evaluated for determining user interest in activities as described above with reference to FIG. 4. For example, in some implementations these actions can be performed for purposes other than obtaining output enhanced with the first user's (or other users') activity data, e.g., to obtain search results from general web pages, comment on friends' content, visit a place, etc., similarly as described above, and the enhanced output from method 500 is additional output for the second user in addition to any intended output.

In block 502, the method checks whether the second user has input a search request or search query. For example, the second user may have input a search request in a search engine of a website that performs searches in web pages on the World Wide Web. In other cases, the second user may have input a search in a web site's search field to search for results only within the web site. In other cases, the second user may have input a search in a search field of a search engine of an application to search for results in local storage (e.g., files and documents stored locally to a client device, or in a particular directory of storage), in a particular set of documents or files, in devices connected in a LAN or other contained network, etc.

If the second user has not input a search, then the method continues to block 506, described below. If a search has been input, then in block 504 the method enhances the search results of the search to include matches (if any) from the portion of the first user's activity data that has been shared with the second user. For example, the method determines activity attributes in the search request that match or are similar to activity attributes in the first user's activity data, e.g., the search request attributes are related to activities of the first user. In some implementations, normal search results are obtained and output using the standard search techniques for the search query (e.g., standard techniques used by an application controlling the search), and the method 500 also performs a search of the portion of the first user's activity data that has been shared with the second user, using the input search query. The method 500 can use the same search process and techniques used by the standard search techniques to search the activity data, if available and appropriate. Alternatively or additionally, the method 500 can search the activity data using different search techniques. For example, the method can find not only direct matches to the search query, but also activity data semantically similar to activity attributes in the search query, similarly as described above in FIG. 4. In some implementations, for location-based matches, the method can find matches in the first user's activity data that are located within a predetermined distance of the current location of the second user, while other matches outside that distance can be ignored. Search parameters such as the predetermined distance can also be made configurable by the second user.

The additional search results obtained from the first user's activity data can be added to the normal or standard (e.g., intended) search results and presented in line with the normal search results. For example, displayed search result matches from web pages on the Internet can be augmented with matches from the first user's accessible activity data displayed amongst the other matches. Alternatively, the additional search results can be highlighted or indicated in a particular way to distinguish the additional search results from the standard search results. For example, the additional search results can be labeled with the name of the first user to indicate the origin of those search results.

In one example, the second user requests a search by inputting a search query of "Paris restaurants" in a search field, such as an Internet search engine. The method 500 also receives the search query and checks whether a shared portion of a first user's activity data has any matches to the query. For example, the method determines that the accessible activity data describes seven restaurants that the first user visited while in Paris three months ago. The names and addresses of these restaurants are included in the activity data. The activity data also includes notes or comments from the first user that indicate his or her opinion of the meals he or she ate at two of the restaurants, and also includes photos taken by the first user at three of the restaurants. The method can collect all of this activity data related to the restaurants and cause it to be output as search results with the normal results obtained by the search engine. For example, the results from the activity data can be presented as links on a display screen above, below, or to the side of the display of the normal search results. Some examples are described below with reference to FIGS. 8-9. In this way, the second user obtains comments, pictures, and other data from the first user's previous activities, which the second user may be more interested in than generic search results from a search engine.

In block 506, the method checks whether the second user has sent, received, and/or selected data related to the accessible first user's activity data. For example, the data can include one or more attributes similar to attributes in the accessible first user activity data. The sending, receiving, or selecting can include any of a variety of actions taken by the second user or by the device of the second user. For example, the second user can select content to view, send, or receive on his or her device, such as text content, image or video content, or audio content, which provide reviews, comments, ratings, books, news, photos, movies, video shorts, chat or other communication content, etc. Or, the second user can select items such as products or services to purchase, sell, bid on, etc. The attributes of such data can be determined by the method by searching for words or phrases in the data (or searching available summaries or synopses of the data), similarly as described above for FIG. 4, for example. The method can then search for similar attributes in the accessible first user activity data, such as similar locations visited by the first user (if the second user data includes locations), comments, ratings, or notes created by the first user that include similar attributes to the second user data, pictures taken by the first user that are related to the second user data, or other activity data related to the second user data.

If the second user did not send, receive, or select data related to the accessible activity data, then the method continues to block 510, described below. Otherwise, in block 508 the method enhances the output of one or more second user devices with a portion of the first user activity data that is relevant to the second user's data. The enhanced output can take any of a variety of forms. For example, the method can cause an output of a list of the activity items that have similar activity attributes on a display of a second user device. In one example, if the second user is reading a text selection or is viewing an image or video selection, the method can cause a display of links to one side of the screen, labeled with the related first user activity data such as items (e.g., text links, links showing related photos or other content data, etc.). The second user can select one of the items to view greater detail of the associated activity data. In another example, the selected data is a product that the second user intends to purchase, and the method causes a display of a similar product purchased by the first user, the date of purchase, and the price paid by the first user, e.g., in a separate window or area of a display screen from the second user's purchase activity.

In block 510, the method checks whether the second user is currently physically located at a location close to any locations described in the shared portion of the first user's activity data. For example, raw latitude and longitude data from GPS sensors on a portable device carried (e.g., held, pocketed, worn, etc.) by the second user can indicate the second user's current location, and/or an address, name of a business at the current location, or other descriptor that can be obtained by the method from accessible information sources. The method can compare the second user's current location to locations described in the accessible portion of the first user's activity data, e.g., looking for matching coordinates, addresses, business names, place names, etc. The method can look to see whether any locations in the accessible activity data is within a predetermined distance of the second user's current location. In some implementations, the method can examine one or more pictures captured at the current location of the second user and compare the second user's pictures to pictures included in the accessible activity data of the first user. For example, the method can compare location metadata of the pictures, and/or compare the content of the pictures to the first user's pictures, e.g., to try to find similar image content within a predetermined similarity threshold.

If the second user is not located close to any locations in the accessible activity data, then the method can continue to block 514, described below. If the second user is located close to any such locations, then in block 512 the method outputs portions of the accessible activity data that is relevant to the current location of the second user. The output can take any of a variety of forms. For example, the method may have found pictures taken by the first user at the close-by location, and such pictures can be displayed, e.g., in a separate portion or window of the display screen, with labels indicating the first user's involvement. The method may have found comments or ratings about the location from the first user's activity data, and can display this content or can display links or icons that will cause the full comments or ratings to be displayed in response to the second user selecting the links or icons. The method can then continue to block 514.

In one example, the user is located next to a restaurant, and the method finds that the same restaurant was visited by the first user (e.g., close-by coordinates are included in the first user activity data), as well as a review of the restaurant by the first user and a picture taken by the first user at the restaurant as included in the activity data. This review and picture can be displayed automatically by the method on the second user's device with, for example, an alert or notification indicating that the first user has been to this location. In this way, the second user can be notified about each location that the first user visited at the time that the second user also visits close to the corresponding locations. In some implementations, the second user can also be notified about the next location that the first user previously visited after the current location, so that the second user can "replay" the first user's tour or vacation in particular areas if desired (e.g., if the first user gave positive recommendations for the tour in the accessible activity data).

In block 514, the method checks whether the second user has requested output of the first user's accessible activity data. For example, the second user can in some implementations input commands to display accessible portions of the first user's activity data on a display screen of a device of the second user. If such commands are not received, then the method can return to block 502 to continue checks. If the second user has input commands to output activity data, then in block 516 the method causes output of portions of the accessible first user's activity data that are requested by the second user. For example, the second user can input commands to display the activity data in desired formats, such as lists, timelines, etc. Some examples of activity data output are described with reference to FIGS. 6, 8, and 9. The method can then return to block 502 for continuing checks.

In some implementations, the second user can select notifications to be output to the second user from one or more second user devices in response to events or conditions related to activity data. For example, the second user can indicate one or more items in the accessible first user activity data for notification, such that a notification is output on the device to the second user in response to the second user performing actions related to the one or more indicated items (e.g., visiting a location, performing a search, etc., related to one or more attributes of first user activities).

In some implementations, the first user and/or second user can prohibit or otherwise limit the access or use of the first user's activity data in the determination and enhancement of the device output, e.g., turn on or off any enhancement, or limit the enhancement to particular activities or activity attributes, etc.

It should be noted that the searching of the first user's activity data to enhance output on the second user's devices can also be performed for other users' activity data that may have been shared with the second user. Such enhancement of second user device output can also be applied based on the second user's own stored activity data, e.g., if the second user would like a reminder as to related activities that the second user performed in the past.

The output of data as described for method 500 can be performed using a server and/or a client device. For example, a server can perform one or more of the checks of method 500, can store activity data, and can provide activity data to a client device, the activity data to be included in enhanced output by a client device used by the second user. In other examples, a client device can store activity data, perform one or more the checks, and provide or include activity data in enhanced output that is output from the client device to the second user.

Various blocks and operations of methods 200-500 can be performed in a different order than shown and/or at least partially simultaneously, where appropriate. For example, some implementations can perform blocks of the methods at various times and/or based on events not related to a user editing an image. In some implementations, blocks or operations of methods 200-500 can occur multiple times, in a different order, and/or at different times in the methods. In some implementations, the methods 200, 300, 400, and/or 500 can be implemented, for example, on a server system 102 as shown in FIG. 1. In some implementations, one or more client devices can perform one or more blocks instead of or in addition to a server system performing those blocks.

Figure 6:
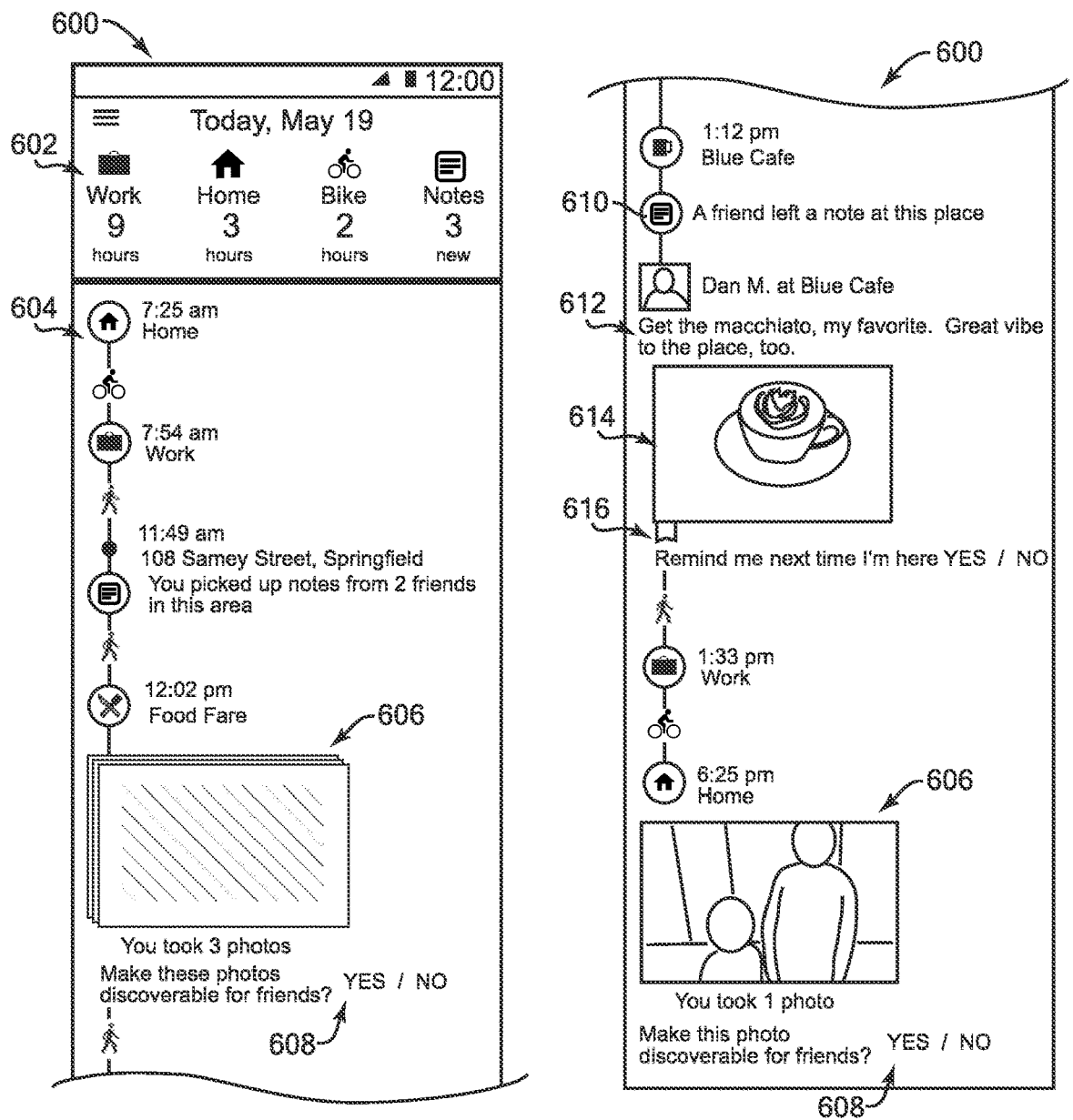
FIG. 6 is a diagrammatic illustration of one example of displayed activity data of a user.

FIG. 6 is a diagrammatic illustration of one example of displayed activity data 600 of a user. In this example, some of the activity data is displayed in a timeline format for easy reference by a user. This timeline can be displayed on a display screen of an electronic device, e.g., on a client device such as a phone, tablet computer, etc. For example, the activity data 600 at the top left can be the beginning of the data displayed in a vertical timeline, which continues down the left side, continues at the top right side, and continues down the right side as shown in FIG. 6. In some cases, a portion of the timeline can be displayed at one time on the screen of a device, with the rest of the timeline displayed by being vertically scrolled onto the screen based on user commands. The activity data 600 can also be provided in a user interface that allows user interaction with portions of the displayed data, as described below.

Activity data 600 can be displayed by a user owning the data, e.g., the first user in the examples described above. For example, the first user can display the timeline to review his or her own activities that occurred in the past. In some implementations, the activity data 600 and interface can also be displayed in a timeline format for a second user (and/or other users) that have been given permission and access to the shown portion of the first user's activity data by the first user, such as in ways described above.

In the example of FIG. 6, activity data 600 includes aggregated summaries 602 of various categories of activity data, including total time spent at work, at home, and bicycling during the previous day, as well as the number of notes received from other users during the previous day. The timeline 604 shows a chronological view of some activities of the first user during the past day, displayed as icons or items in the timeline and some of which also have timestamps displayed. Such items include locations at which the user was located (e.g., work, home, restaurant, cafe), and modes of travel (e.g., bicycling and walking). In some implementations, photos taken by the user can be displayed, such as photos 606, after the items that indicate the locations and times they were captured along the timeline. These photos can be manually shared by the first user with friends (such as the second user and/or other users defined in user groups of a social networking service or other service), e.g., by selecting options 608. In other cases, the first user may have input text content, audio content, or other content that can also be displayed in the timeline at the appropriate locations and times and shared if desired.

The timeline 604 also can include notes that have been shared or made discoverable by other users, such as friends of the first user. For example, a note 610 may have been made shareable by a friend if the first user travels to a particular location, such as the cafe shown, as detected by the device carried by the first user (e.g., using GPS sensors or other sensors/signals). The timeline can also display the contents of the note 610, such as text comments or reviews 612 and a photo 614 (or other content) captured or created by the friend at the location or related to the location in some way (e.g., showing a product sold there, a sight seen there, etc.). The user can also select an option 616 to be reminded on his or her device to display the note 610 when the first user next goes to this location, e.g., to be reminded of a friend's recommendation for a particular product.

In some implementations, further details can be view by the user accessing the activity data 600. For example, any of the items in the timeline 604 can be selected by the user using an input device (e.g., touchscreen, mouse, etc.) to view greater details such as a timeline at a higher resolution of time, a breakdown of activities during that time, further descriptions, etc.

In some implementations, the first user can manually share activity data based on the displayed activity data. For example, the first user can select a portion of the displayed activity data and share that with one or more other users, such as the second user. For example, a box can be drawn around a portion of the timeline 604 and all the first user's activity data within that time period (or only the displayed activity data within that time period) can be shared with other users specified by the first user.

Figure 7:
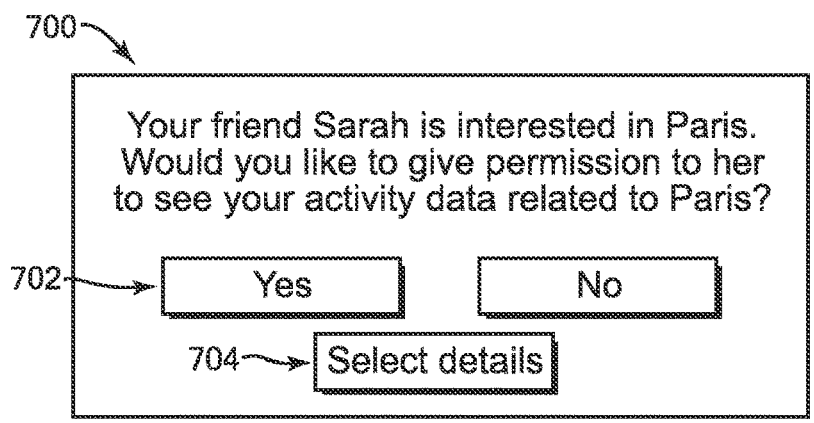
FIG. 7 is a illustration of an example displayed prompt that can be sent to the first user to request permission for the second user to access a portion of the first user's activity data.

FIG. 7 is an illustration of an example displayed prompt 700 that can be sent to the first user to request permission for the second user (or other users) to access a portion of the first user's activity data, as described above with reference to FIG. 4. For example, the second user can be "Sarah" in this example and the portion of activity data is related to "Paris." The first user can select one of the displayed buttons to permit or deny the access to the portion of activity data. In some implementations, the first user can select a button 704 to view the activity data that is being requested for permission to share, and the first user can select designated activity data to be shared in more detail, e.g., using a displayed graphical interface.

Figure 8:
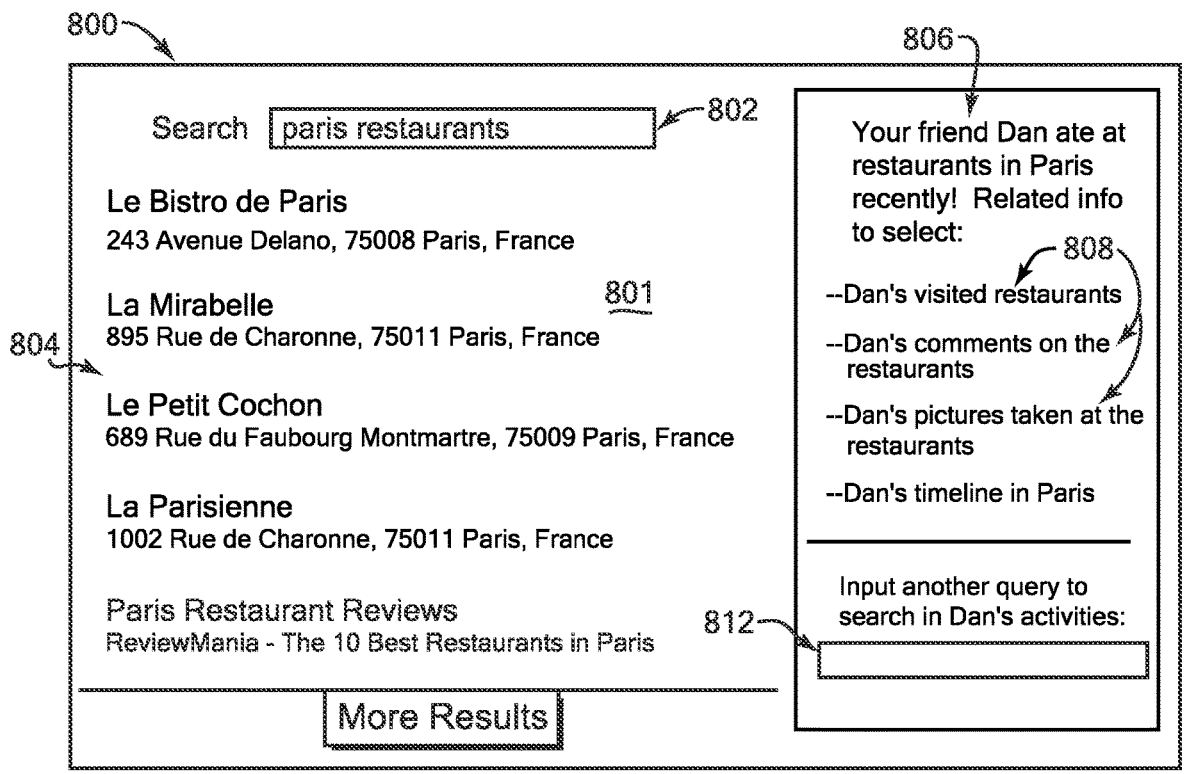
FIGS. 8 and 9 are illustrations of an example displayed interface demonstrating one or more features described herein.

FIG. 8 is an illustration of an example displayed interface 800 demonstrating one or more features described herein. Interface 800 can be displayed by a server or client device, e.g., on a display screen, via audio output, etc. In this example, the second user has been granted access to a selected portion of the first user's activity data as described above for FIG. 4, and device output for the second user can be enhanced with that activity data as described above for FIG. 5. For example, the second user may have (along with performing other types of actions) input searches of various subjects in search engines similar to that shown in FIG. 5 before having been granted access to the first user's activity data, where the method of FIG. 4 matched attributes of those search queries to portions of the first user's activity data and made those activity data portions accessible to the second user and to new searches performed by the second user, as described above.

In this example, the second user has input a search query 802 to a search application, such as a web search engine of a web page displayed in a browser or other application. For example, the second user has a purpose in finding matches to the query 802 from web pages located over the Internet and/or from other publicly-accessible data sources on the Internet. In response to the search query 802, the search engine has found search results 804 from such standard Internet data sources, which it displays underneath the search query in a left portion 801 of the interface, in this example. In this example, the search results 804 are links to web pages accessible on the Internet that have been matched to the search query by the search engine.

In addition, according to one or more features described herein, the search application also displays output information 806 to enhance the search results 804. Information 806 includes a notification that one or more users known to the second user have activity data including one or more activity attributes related to the search query. In this case, the notification indicates that first user Dan has Paris restaurant data in his activity data that is accessible to the second user. This is displayed, for example, after the method 500 has determined that accessible activity data of the first user has activity attributes matching one or more attributes of the search query. Some implementations can also display the time period of the first user's activity data that was searched (not shown).

In addition, in some implementations additional information and/or options can be displayed to the second user in information 806. For example, links 808 can be selected by the second user to display details about the first user's activity data as described by the links. For example, the user can select to view the matching attributes themselves (e.g., restaurants visited), or just comments made by the first user about those attributes or activities, just pictures taken by the first user related to the matching attributes, or a timeline of the first user's activities related to the matching attributes (e.g., a timeline of activities similar to the displayed timeline of FIG. 6). Some implementations can also display a prompt 812 that allows the second user to input a different query or attribute (e.g., topic or subject) to search for in the activity data of the first user, and which can cause the output 806 to change based on the new query.

Figure 9:
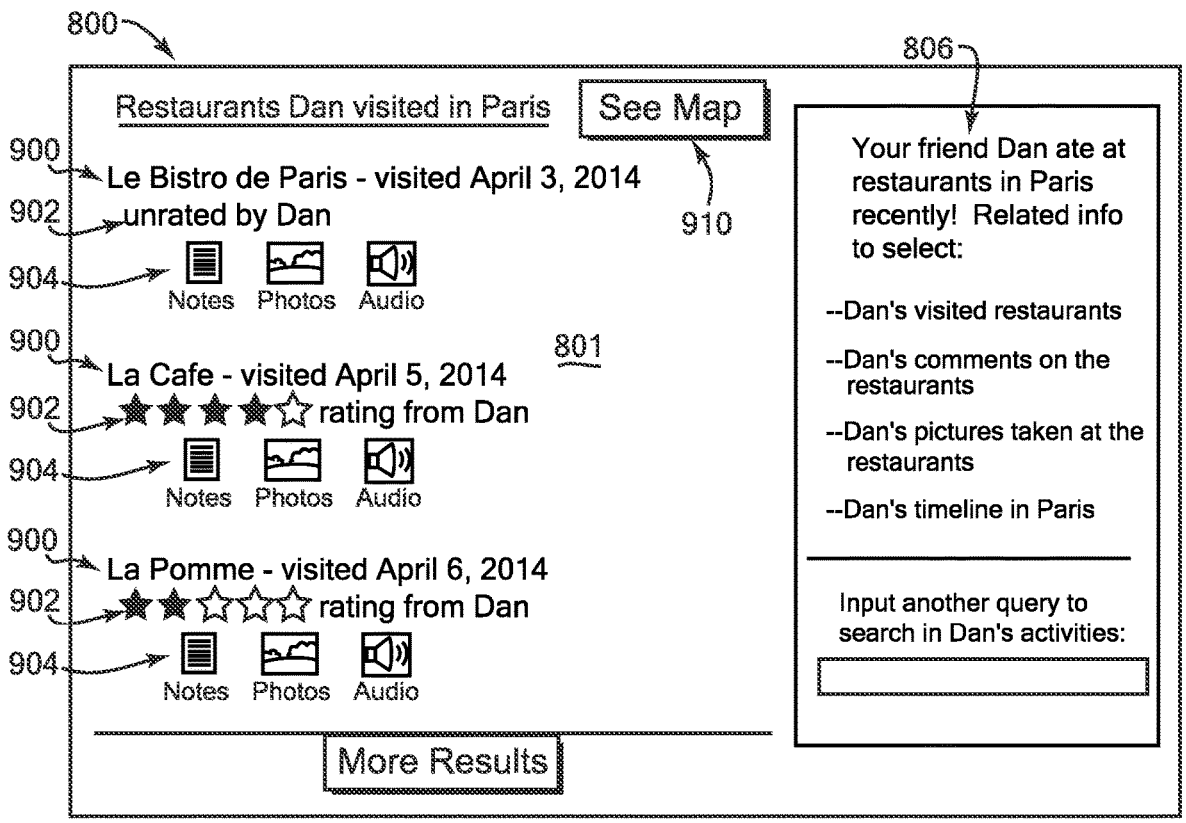

FIG. 9 is an example illustration of the interface 800 of FIG. 8 after the second user has selected one of the links displayed in the information 806 of FIG. 8. For example, if the user selected the "visited restaurants" link 808, then the display in the left portion 801 of the interface 800 can be changed to display information related to the selected link. In this example, matched items 900 related to the search query 802 are displayed in a list format, which are the restaurants visited in the first user's activity data, along with the date that the first user visited each restaurant. Ratings 902 from the first user for each restaurant can also be displayed. In addition, any other metadata or related content associated with each listed item can also be accessed by the second user. For example, icons 904 can allow the user to select to view text notes, image data such as photos, and audio data such as voice recordings that are associated with each restaurant. For example, the first user may have created this associated content when engaging in the related activity (e.g., going to and eating at the restaurant).

In some implementations, the second user can also access other related data. For example, a particular item 900 can be selected to view greater detail about the item, such as the particular times at which the first user was located at the restaurant or performed the activity (eating), or other generally known information about the item from other accessible information sources (e.g., Internet web sites and other sources). In some implementations, the second user can cause a map to be displayed showing the selected item. For example, a map button 910 can be selected to display a map showing all of the matched items 900 in their respective relative locations.

Figure 10:
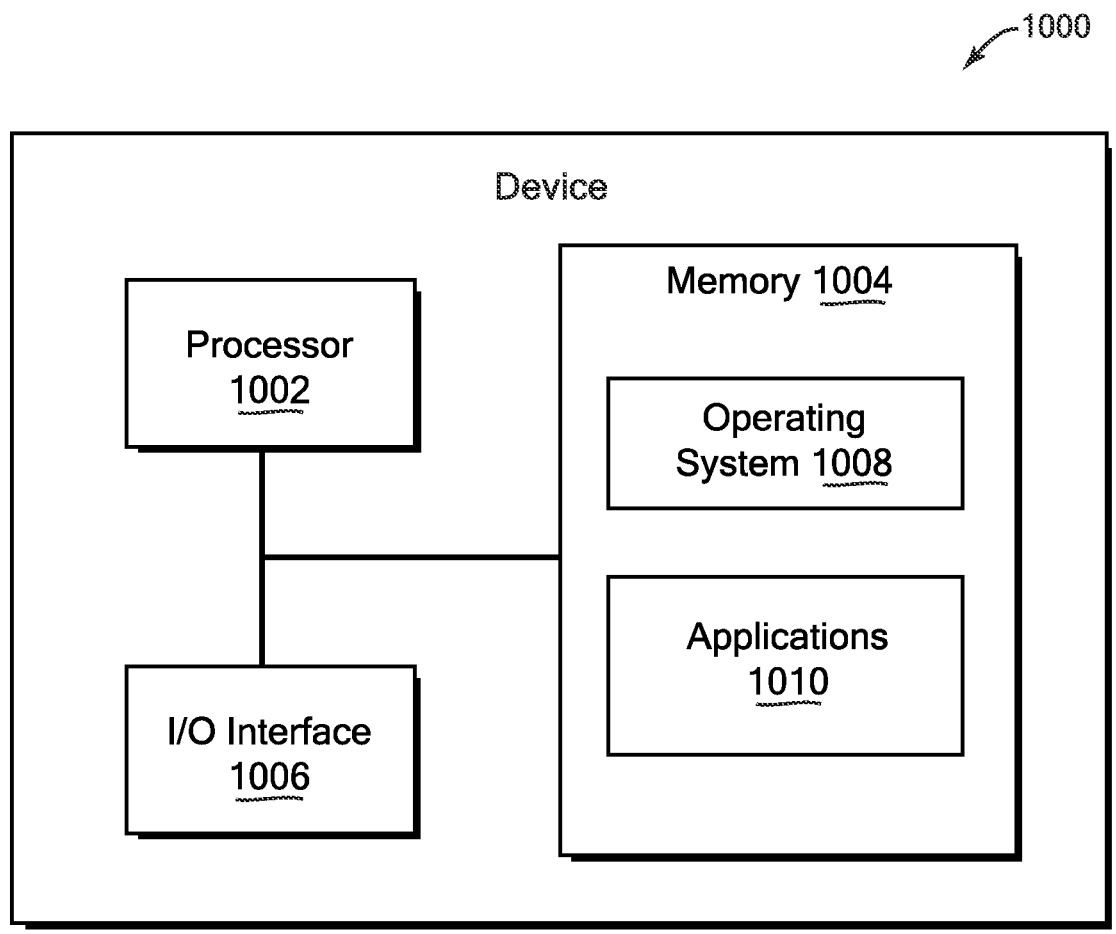
FIG. 10 is a block diagram of an example device which may be used for one or more implementations described herein.

FIG. 10 is a block diagram of an example device 1000 which may be used to implement one or more features described herein. In one example, device 1000 may be used to implement server device 104 of FIG. 1, and perform appropriate method implementations described herein. Device 1000 can be any suitable computer system, server, or other electronic or hardware device. For example, the device 1000 can be a mainframe computer, desktop computer, workstation, portable computer, or electronic device (portable device, cell phone, smart phone, tablet computer, television, TV set top box, personal digital assistant (PDA), media player, game device, wearable device, etc.). In some implementations, device 1000 includes a processor 1002, a memory 1004, and input/output (I/O) interface 1006.

Processor 1002 can be one or more processors or processing circuits to execute program code and control basic operations of the device 1000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1004 is typically provided in device 1000 for access by the processor 1002, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1002 and/or integrated therewith. Memory 1004 can store software operating on the device 1000 by the processor 1002, including an operating system 1008 and one or more applications engines 1010 such as a graphics editing engine, web hosting engine, social networking engine, etc. In some implementations, the applications engines 1010 can include instructions that enable processor 1002 to perform the functions described herein, e.g., some or all of the methods of FIGS. 2-5. Any of software in memory 1004 can alternatively be stored on any other suitable storage location or computer-readable medium. In addition, memory 1004 (and/or other connected storage device(s)) can store activity data, permission data, lists of users, content data (images, text, audio, etc.), and/or processes and other instructions and/or data used in the features described herein. Memory 1004 and any other type of storage (magnetic disk, optical disk, magnetic tape, or other tangible media) can be considered "storage devices."

I/O interface 1006 can provide functions to enable interfacing the device 1000 with other systems and devices. For example, network communication devices, storage devices such as memory and/or database 106, and input/output devices can communicate via interface 1006. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 10 shows one block for each of processor 1002, memory 1004, I/O interface 1006, and software blocks 1008 and 1010. These blocks may represent one or more processors or processing circuitries, operating systems, memories, I/O interfaces, applications, and/or software modules. In other implementations, device 1000 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can include some similar components as the device 1000, such as processor(s) 1002, memory 1004, and I/O interface 1006. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the images and other data as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text and/or describes settings, notifications, and permissions.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., images depicting the user, information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:
    obtaining user input from a second user, the user input provided to a second user device of the second user, wherein the user input provides a search request that includes one or more second topics to search for in one or more data sources accessible to the second user device;
    determining whether the one or more second topics have been included in at least a threshold number of previous search requests and comments input to the second user device;
    in response to obtaining the user input from the second user, finding one or more first topics included in activity data of a first user, wherein the one or more first topics are at least one of: syntactically similar and semantically similar to the one or more second topics, wherein finding the one or more first topics includes searching for the one or more first topics in the activity data in response to determining that the one or more second topics have been included in the at least the threshold number of previous search requests and comments;
    in response to finding the one or more first topics, transmitting, by a server over a communication network, a request to a first user device of the first user to share a requested portion of the activity data of the first user with the second user, wherein the requested portion of the activity data is associated with the one or more first topics and wherein the request identifies the second user;
    receiving, at the server, share input that is provided to the first user device by the first user in response to the request, the share input indicating to share a designated portion of the activity data of the first user with the identified second user, wherein the designated portion of the activity data is selected by the share input provided by the first user to the first user device and wherein the designated portion of the activity data excludes part of the requested portion of the activity data;

in response to receiving the share input, causing the designated portion of the activity data of the first user to be made accessible to the second user device over the communication network; and in response to the designated portion of the activity data of the first user being made accessible to the second user, transmitting information from the server to the second user device over the communication network to be displayed by the second user device, wherein the information is derived from the designated portion of the activity data of the first user.

2. The method of claim 1, wherein the designated portion of the activity data is selected from the requested portion of the activity data, wherein the request causes a prompt to be displayed on the first user device, wherein the share input is provided to the first user device by the first user in response to the display of the prompt.

3. The method of claim 2, wherein additional input, received from the first user in response to the display of the prompt, designates a time period, and wherein causing the designated portion of the activity data of the first user to be made accessible to the second user device includes:

finding particular activity data that was generated by the first user device within the time period; and providing the particular activity data in the designated portion of the activity data.

4. The method of claim 1, wherein a plurality of search results are provided in response to receiving the search request, and further comprising:

detecting one or more selections, received from the second user, of one or more of the plurality of search results, wherein the plurality of search results are displayed on the second user device in response to the search request, wherein the one or more selections each include one or more fourth topics, in response to obtaining the user input of the second user, determining one or more third topics included in the activity data of the first user, wherein the one or more third topics correspond to the one or more fourth topics; and in response to the one or more third topics being included in the designated portion of the activity data of the first user, providing second information for presentation via the second user device, wherein the second information is derived from the one or more third topics.

5. The method of claim 1, further comprising detecting one or more text comments input by the second user on the second user device, wherein the one or more text comments are sent to one or more other devices, wherein the one or more text comments include one or more third topics, wherein the one or more first topics included in the activity data of the first user include words determined to correspond to the one or more third topics.

6. The method of claim 1, further comprising:

detecting a current geographic location of the second user device; and determining that the current geographic location is within a threshold distance of a first geographic location that is described in the activity data of the first user, wherein the first user device was previously located at the first geographic location on a prior day previous to a current day when the second user device is detected at the current geographic location, wherein the requested portion of the activity data is associated with the first geographic location and at least a part of the requested portion of the activity data was input to the first user device on the prior day.

7. The method of claim 1, wherein at least one of the one or more second topics in the search request is descriptive of a geographic location, wherein transmitting the request to the first user device includes:

finding one or more particular portions of the activity data of the first user that were generated when the first user device was physically located at the geographic location; and providing the one or more particular portions of the activity data in the requested portion of the activity data.

8. The method of claim 1, further comprising determining that the first user has a social connection to the second user indicated by at least one of: information of the first user included in a contacts list stored on the second user device, and information of the first user included in data stored by a social networking service for the second user.

9. The method of claim 1, wherein a plurality of search results are output on the second user device in response to the search request, wherein transmitting the information to the second user device includes providing the designated portion of the activity data in at least one of the plurality of search results, wherein the plurality of search results include at least one result derived from at least one data source of the one or more data sources that excludes activity data of users.

10. The method of claim 1, further comprising:

after the designated portion of the activity data is made accessible to the second user device, receiving selections from the second user by the second user device that select one or more items in the designated portion of the activity data; and causing a notification to be output on the second user device in response to:

obtaining second input received from the second user, wherein the second input includes a second search request that includes one or more third topics; and determining that at least one of the one or more items in the designated portion of the activity data correspond to at least one of the one or more third topics.

11. A method comprising:

detecting one or more text comments input by a second user on a second user device and sent to one or more other users, wherein the one or more text comments include one or more second words;

determining that the one or more text comments include one or more words that were included in at least a threshold number of previous comments input to the second user device from the second user;

in response to detecting the one or more text comments, finding, by a server, one or more first words included in activity data of a first user, wherein the one or more first words correspond to the one or more second words, and wherein the activity data is descriptive of one or more activities performed by the first user, wherein finding the one or more first words included in the activity data of the first user includes searching for the one or more first words in the activity data in response to determining that the one or more text comments include the one or more words that were included in the at least the threshold number of the previous comments;

in response to finding the one or more first words, transmitting by the server over a communication network, a request to a first user device of the first user to share a requested portion of the activity data of the first user with the second user, wherein the requested portion of the activity data is associated with the one or more first words, wherein the request identifies the second user and causes a prompt to be displayed on the first user device;

in response to the transmitting of the request and display of the prompt on the first user device:

receiving at the server a selection from user input provided to the first user device by the first user in response to the display of the prompt, wherein the selection selects a designated portion of the requested portion of the activity data, wherein the designated portion excludes a part of the requested portion, and receiving at the server an indication from the user input provided to the first user device, wherein the indication indicates to share the designated portion of the activity data of the first user with the identified second user;

in response to receiving the selection and the indication, causing the designated portion of the activity data of the first user to be made accessible to the second user device; and in response to the designated portion of the activity data of the first user being made accessible to the second user, transmitting information by the server to the second user device over the communication network to be displayed by the second user device to the second user, wherein the information is derived from the designated portion of the activity data of the first user.

\* \* \* \* \*